United States Patent Office 2,900,349
Patented Aug. 18, 1959

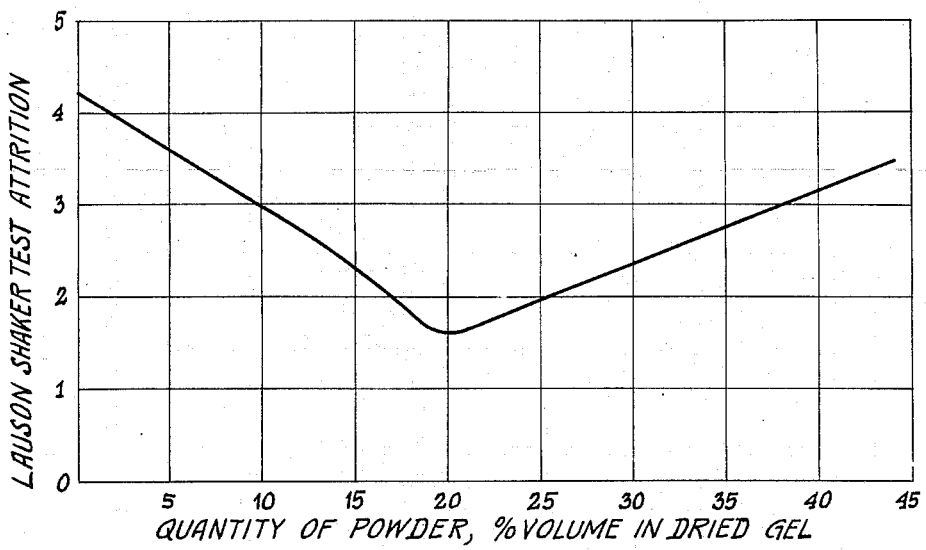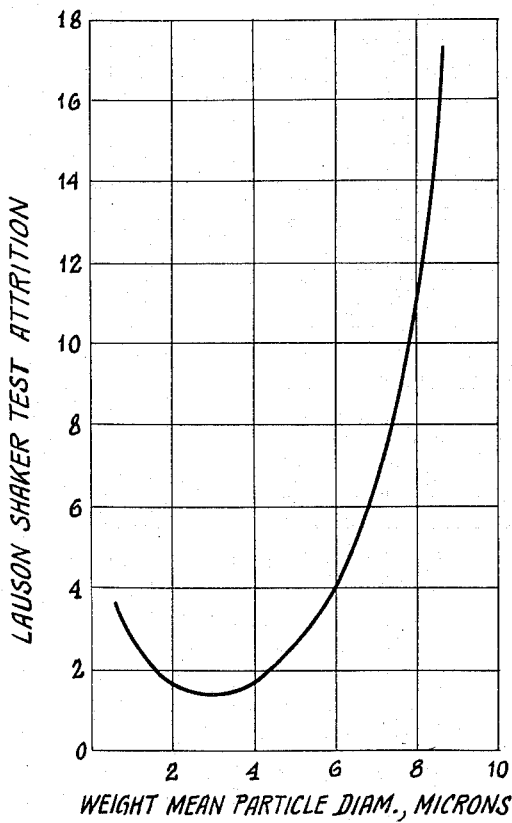

2,900,349

ATTRITION-RESISTANT INORGANIC OXIDE GELS AND METHOD FOR PREPARING THE SAME

Albert B. Schwartz, Philadelphia, Pa., assignor to Socony Mobil Oil Company, Inc., a corporation of New York Application February 11, 1954, Serial No. 409,586

18 Claims. (Cl. 252—317)

This invention relates to inorganic oxide gels characterized by a high resistance to attrition and to a process for producing such gels. More particularly, the invention is directed to improvement in handling strength of gels and gel composites finding use as adsorbents, desiccants, catalysts, catalyst supports, carriers, and in various other applications where rigidity and ability to withstand abrasion upon handling are considered desirable attributes.

Modern catalytic processes require catalysts which are not only specifically active in the chemical reactions which are to be catalyzed but also possess physical characteristics required for successful commercial operation. One of the outstanding physical attributes of a commercial catalyst is hardness, i.e., the ability to resist attrition. The ability of a particle to hold its shape in withstanding the mechanical handling to which it is subjected upon storage, shipment, and use is a primary requirement for a successful catalyst and for modern catalytic processes.

Thus, many operations for the conversion of hydrocarbon materials are carried out in the presence of inorganic oxide gels which themselves have a catalytic effect or which are impregnated with or act as a support for other catalytic material of a nature appropriate to the result desired. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard, porous gel catalyst, having the ability to withstand abrasion during the necessary handling involved during continual conversion and regeneration, is definitely desirable in overcoming the aforementioned disadvantages.

Likewise, in those instances where advantage is taken of the adsorbent or desiccant characteristics of inorganic oxide gels, it is highly desirable to employ a gel having the ability to resist attrition and thereby obviate contamination of the material undergoing treatment with gel fines. This is particularly the case where desiccant gel particles are tumbled or otherwise agitated in direct contact with the material being treated.

Inorganic oxide gels employed in the above and various other operations have generally been prepared by the formation of a sol of desired composition that sets to a hydrogel after lapse of a suitable period of time. The hydrogel is then dried to remove the liquid phase therefrom. It has heretofore been suggested that various finely divided water-insoluble solids be added to the sol before the same undergoes gelation for the purpose of increasing the porosity of the ultimate dried gel so that the regeneration characteristics thereof are enhanced upon use in catalytic hydrocarbon conversion operations. It has also been proposed that pulverized dried gel, clay, and similar materials be incorporated in the hydrosol before gelation in order that the hydrogel resulting upon setting of such hydrosol may be subjected to rapid drying without undergoing substantial breakage. The improved regeneration characteristics and the improvement in drying obtained with the aforementioned gels have been attributed to the fact that the finely divided solid contained in the hydrosol does not shrink to the extent that the hydrogel does during drying, thereby creating in the resulting dried gel a large number of macropores having diameters greater than about 1000 Angstrom units. While the gels so prepared containing pulverized material of appreciable particle size exhibit improvement in regeneration and during drying, the physical strength thereof has been weakened due to the presence of large pores in the gel. Specifically, resistance to attrition of such gels has been found to be distinctly less than that of a comparable gel in which the foregoing pulverized material was absent.

Gel preparation has heretofore been carried out by drying hydrogel in a mass, which is subsequently broken up into pieces of desired size. Hydrogel has also been prepared and dried in the form of small pieces of predetermined shape such as obtained by extrusion, pelleting, or other suitable means. In more recent years, gels have been produced in the form of spheroidal bead-like particles. The latter have had the advantage over irregularly shaped gel particles and over those obtained by extrusion or pelleting by being more resistant to attrition. However, since further improvement in resistance to attrition of gel beads, as well as other forms of gel, is a distinct advantage in commercial operation, serving to reduce the overall operating cost of a process utilizing the same, a method for increasing the attrition resistance generally of inorganic oxide gels is highly desirable. The incorporation of finely divided solids of the type referred to hereinabove in the hydrosol used for the formation of gel beads has been found to undesirably decrease the hardness characteristics thereof, rendering the gel beads so produced more susceptible to attrition.

One object of the invention, therefore, is to provide an inorganic oxide gel of improved hardness. Another object is the provision of a process for improving the resistance to attrition of a dried gel. A still further object is the provision of improved attrition-resistant spheroidal gel particles. Still another object is to provide a commercially feasible process for producing inorganic oxide gels having unusual resistance to attrition. Other objects and advantages of the invention will be apparent to those skilled in the art from the following description.

In accordance with this invention, it has been discovered that an inorganic oxide gel with unusual resistance to attrition may be prepared by incorporating in an inorganic oxide sol a quantity of solid powdered material insoluble in the sol, having a weight mean particle diameter of between 1 and 5 microns and preferably between 2 and 4 microns. The amount of powdered material so incorporated is generally between about 5 percent and about 40 percent by volume and preferably between about 15 and about 30 percent by volume of the dried gel product, although improvement in some instances has been observed with an amount as low as about 2 volume percent. The powder-containing inorganic oxide sol sets to a hydrogel after lapse of a suitable period of time and the resulting hydrogel is thereafter dried to a gel at a temperature below the fusion point of the incorporated powder. It has been found that an inorganic oxide gel resulting from the setting of a sol containing powdered material of the aforementioned critical particle size and drying of the resulting hydrogel at a temperature below the fusion point of the added material has a substantially greater resistance to attrition than inorganic oxide gels containing pulverized material of particle diameter in excess of 5 microns and unexpectedly even has a greater resistance to attrition than comparable gel which does not contain such added powder.

Inorganic oxide gels, in general, are improved with regard to hardness characteristics by the method of this invention. Thus, gels of silica, alumina, molybdena, magnesia, chromia, zirconia, thoria, titania, manganese oxide, and composites thereof may be rendered more resistant to attrition by the present process. The gels so prepared may comprise a single inorganic oxide or may be cogels of two or more inorganic oxides. The gel, after preparation, may, if necessary, be impregnated with various materials to impart desired catalytic characteristics thereto. It is contemplated that the inorganic oxide gels prepared in accordance with the present invention may be subjected to any of the uses for which such gels have heretofore been employed. Instant gels are of particular value in processes where attrition has been a prevalent problem. Representative, but non-limiting, uses of the present gels are as catalysts, catalyst supports, adsorbents, desiccants, and zeolites. The particular composition of the gel will largely be governed by its intended use.

Likewise, the particular physical form of the gel will be determined principally by the use to which it is to be subjected. The process described herein may be employed in preparation of the gel in any desired physical form. Thus, the hydrosol containing added powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the powder-containing hydrogel. Also, the hydrosol may be introduced into the perforations of a perforated plate and retained therein until the sol has set to a hydrogel, after which the formed hydrogel pieces are removed from the plate. The method of the invention is especially useful as applied to the manufacture of spherically shaped gel particles produced by introducing drops of hydrosol into a water-immiscible liquid wherein the hydrosol sets to spheroidal bead-like particles of hydrogel. Larger size spheres are ordinarily within the range of from about 1/64 to about 1/4 inch in diameter, whereas smaller size spheres, which are generally referred to as microspheres, are within the range of from about 10 to about 100 microns in diameter. The use of spherically shaped gel particles is of particular advantage as catalysts in hydrocarbon conversion processes, including the moving catalyst bed process, the fluidized process, etc., in which the spheroidal gel particles are subjected to continuous movement. As applied to the stationary bed, spheroidal gel catalyst particles provide effective contact between the reactants and the catalyst by avoiding channeling.

It is accordingly a preferred embodiment of the present invention to prepare the described attrition-resistant gel in the form of spheres although it is to be realized that the method hereinafter set forth may also be employed in obtaining a mass of gel which may thereafter be broken up into particles of desired size. Likewise, the method described herein may be used for the preparation of inorganic oxide gels in the form of particles of any other desired size or shape.

In accordance with the process of the invention, an inorganic oxide hydrosol is prepared containing between about 2 and about 40 percent by volume, based on the ultimately dry gel, of a powdered solid insoluble in the sol having a weight mean particle diameter of between 1 and 5 microns and preferably between 2 and 4 microns. It has been found, as will be evident from data hereinafter set forth, that the above particle size is an essential and critical factor in imparting the desired attrition resistance to the prepared gel. The powdered material may be added by dispersing in an already prepared hydrosol or, as is preferable where the hydrosol is characterized by a short time of gelation, the powder may be added to one or more of the reactants used in forming the hydrosol or may be admixed in the form of a separate stream with streams of the hydrosol-forming reactants in a mixing nozzle or other means where the reactants are brought into intimate contact. The powder may also be introduced into the hydrosol by the formation in situ of a finely divided precipitate in one or more of the reactant streams by contacting appropriate chemicals either dissolved in reactant streams or in separate streams. Likewise, a powder may be introduced in an already prepared hydrosol by dispersing therein materials which will form a finely divided precipitate. The latter methods in which a precipitate is formed in the hydrosol or in reactants used in preparation thereof have generally not been found to be as desirable as the addition of powder which has been previously ground to the requisite particle size and thereafter introduced into the hydrosol or during the course of hydrosol formation since, as noted hereinabove, close control of the particle size of the added material in the range of 1 to 5 microns is essential to the success of the instant process. As a general rule, it has been found that the particle size of the added material may be controlled with greater accuracy by grinding than by precipitation, although it is to be understood that the present process contemplates the incorporation of the described powdered material in a hydrosol employing any of the foregoing or other feasible techniques.

The particle size distributions of the powders incorporated in the hydrosol in accordance with the present process were determined by sedimentation methods. The weight mean particle diameters were determined by plotting the cumulative percent of powdered material smaller than a given diameter against particle diameter, dividing the total size range into a number of small fractions, and calculating as follows:

$$\text{weight mean diameter} = \frac{\sum d_i g_i}{\sum g_i}$$

where $d_i$ is the mean particle size of the fraction in microns and $g_i$ is the corresponding weight percent material in the fraction. The percent volume fines in the dried gel was calculated from the particle densities of powdered material, i.e., the density of the material, excluding void space between the particles but including pore volume of the particles and of dried gel which contained no added powder.

In addition to having the above critical particle size, the powdered solid incorporated in the hydrosol should necessarily be insoluble therein and should further be characterized by being infusible at the hydrogel drying temperature. The form of hydrogel is generally maintained substantially constant from a time prior to gelation until after the gel has been dried. During drying, the hydrogel undergoes considerable shrinkage. The extent of drying, in accordance with the present procedure, will depend somewhat on the use which it is desired to make of the product but, in any event, the drying is carried to a stage beyond that at which maximum shrinkage of the gel is obtained. The gel, after syneresis or shrinkage thereof has been completed, is substantially dry; that is, the gel possesses open pores free of liquid although it still contains a relatively small percentage of water which is evolved upon subjecting the gel to a relatively high temperature. Hydrogel containing fine powder dispersed therein, prepared as in the present process, may be dried at room temperature or at higher temperatures in air or steam, as well as in various inert or reducing atmospheres. While the prepared hydrogel may be dried at ambient temperature by merely exposing to the air, it is preferred to accelerate the removal of liquid phase from the hydrogel by drying at a temperature in the range of about 150° F. to about 400° F. until shrinkage of the hydrogel is substantially complete. Drying is preferably carried out in superheated steam. To impart maximum attrition resistance to the gel, it is further a preferred embodiment of the invention to subject the dried gel to calcination in inert gas, air, steam, or mixtures thereof at a temperature below that at which sintering is encountered and generally in the approximate range of 1150° F. to 1400° F. for a period of about 1 hour or more, generally from about 1 to about 24 hours. It is to be understood that the present process is applicable in imparting hardness characteristics to gels which have been dried to the point of maximum shrinkage and which may thereafter undergo the described further drying and/or calcining treatment. In every instance, at a comparable stage of drying or thermal treatment, it has been observed that the gel containing the powdered material described herein was harder than a gel containing pulverized material of larger particle size or gel prepared in the absence of added material. Thus, the improvement in resistance to attrition obtained with present gels was observed both in the case of gels which had been merely dried and in the case of gels which had undergone calcination. The latter gels, however, exhibited optimum hardness and it is accordingly preferred to subject the gels prepared as described herein to a final calcination treatment.

The powder incorporated in the sol in accordance with the present invention may be catalytically active or an inert material. The particular chemical composition of the powder does not appear to be of importance in so far as its ability to impart attrition resistance to the ultimate gel is concerned. It is essential that the powdered material (1) have a weight mean particle diameter in the range of 1 to 5 microns, and preferably between 2 and 4 microns, (2) that it be insoluble in the sol, i.e., that it maintain its powdered status upon dispersion in the sol, and (3) that it be infusible at the temperature of drying the hydrogel and the temperature of calcination where such latter treatment is employed. The reason for the unusual hardness characteristics of the present gel is not known with certainty. It would appear, however, that some cementation or hardening takes place during the setting and/or drying of the hydrogel containing the specified powdered material. It has been observed in carrying out the process of the instant invention, wherein a hydrosol is prepared containing powdered material of the critical particle size set forth hereinabove, allowing such hydrosol to set to a hydrogel, and drying the resulting hydrogel, that a structural change takes place in the incorporated powdered material. Thus, it has been observed, using powdered material originally crystalline in structure, that such material was amorphous upon examination by X-ray diffraction of the finished gel product.

As apparent from the above, the particular powdered material to be incorporated in the hydrosol will be chosen so as to be insoluble therein and to be infusible at the drying temperature. Observing these essential features, suitable representative materials having a weight mean particle diameter of 1–5 microns include dried gels or gelatinous precipitates, such as those of silica, alumina, magnesia, chromia, molybdena, zirconia, thoria, titania, and the like, including composites thereof. Other suitable materials are sand; clay; graphite; carbon black; metals, including aluminum, antimony, beryllium, boron, cerium, cobalt, copper, gold, iridium, iron, magnesium, manganese, molybdenum, nickel, osmium, palladium, platinum, ruthenium, silicon, silver, tantalum, thorium, titanium, tungsten, vanadium, and zirconium; oxides, including aluminum oxide, antimony oxide, barium oxide, beryllium oxide, bismuth trioxide, boron oxide, cadmium oxide, calcium oxide, cerium oxide, chromic oxide, chromium trioxide, cobaltous oxide, cobaltic oxide, cupric oxide, molybdenum oxide, nickel oxide, phosphorous pentoxide, cuprous oxide, ferrous oxide, ferric oxide, magnesium oxide, manganese oxide, thallium oxide, thorium oxide, stannic oxide, stannous oxide, titanium oxide, uranium oxide, vanadium oxides, zinc oxide, zirconium oxide, and silicon oxide in its various forms, including cristobalite and quartz; metal silicates, including aluminum silicate, barium silicate, cadmium silicate, calcium silicate, lead silicate, lithium silicate, magnesium silicate, strontium silicate, zinc silicate, and zirconium silicate; metal phosphates, including aluminum phosphate, calcium metaphosphate, calcium pyrophosphate, lead phosphate, magnesium pyrophosphate, manganese pyrophosphate, and zinc phosphate; metal fluorides, including aluminum fluoride, beryllium fluoride, calcium fluoride, barium fluoride, cerium fluoride, chromium fluoride, cuprous fluoride, lead fluoride, magnesium fluoride, manganese fluoride, and strontium fluoride; metal fluosilicates, including magnesium fluosilicate, aluminum fluosilicate, barium fluosilicate, and calcium fluosilicate; metal sulphides, including bismuth sulphide, cadmium sulphide, cobalt sulphide, cuprous sulphide, iron sulphide, lead sulphide, molybdenum sulphide, nickel sulphide, silver sulphide, and zinc sulphide; metal carbides, including boron carbide, chromic carbide, molybdenum carbide, silicon carbide, tungsten carbide, and vanadium carbide; as well as various other metal compounds, including barium carbonate, barium sulphate, boron nitride, ferric phosphide, ferrous phosphide, lead chromate, lead sulphate, lead selenide, magnesium aluminate, manganese phosphide, manganese silicide, nickel arsenide, nickel phosphide, platinum arsenide, silver telluride, stannous telluride, titanium nitride, and zinc telluride. The above list is not to be considered exhaustive since it is contemplated that other materials having the above-described physical features of insolubility and infusibility may likewise be employed in the process of this invention. Of the foregoing recited materials, particular preference is accorded inorganic oxide gel powders and especially powdered siliceous and aluminous gels due to the ease of preparation, ready availability, and inexpensiveness of these materials.

The process of the invention may be carried out on a batch, semi-batch, or continuous basis. Thus, the hydrosol formed, containing powdered solid of the type described hereinabove, may be conducted into setting tubs and allowed to remain therein for a sufficient time to effect gelation, after which the resulting hydrogel is removed, broken up into pieces of desired size, base-exchanged if necessary or desirable, and washed to remove soluble material therefrom. The washed hydrogel is thereafter dried and, if desired, calcined at an elevated temperature. The instant process, as indicated above, has been found to be particularly useful for the production of gel in the form of spheroidal particles. The hydrosol containing powdered material produced in accordance with this invention may be made into spheroidal particles by any feasible process, such as the methods described in patents to Marisic, for example, U.S. 2,384,946. Broadly, such methods involve introducing globules of hydrosol into a column of water-immiscible liquid; for example, an oil medium wherein the globules of hydrosol set to a hydrogel and subsequently pass into an underlying layer of water from which they are sluiced to further processing operations, such as hydrothermal treatment, base-exchange, water-washing, drying, and calcining.

The resulting hydrogel may, if desired, be initially subjected to a hydrothermal treatment, i.e., contacting the hydrogel with water at an elevated temperature for a specified period of time. Such treatment, however, is not considered essential to the success of the present process in affording a hard, attrition-resistant gel. The hydrogel is thereafter water-washed to remove soluble material. In those instances where it is desirable to remove zeolitic alkali metal introduced into the hydrogel through the use of an alkali metal silicate reactant, the hydrogel may be base-exchanged with a suitable aqueous solution before water-washing. The base-exchange solution may be one capable of replacing zeolitic alkali metal without the introduction of an additional metal or metal compound into the hydrogel, such as a solution of an ammonium salt or an acid. By using a base-exchange solution of a metal salt other than a metal already contained in the hydrogel, it is possible to introduce quantities of an additional metal oxide into the hydrogel composite. The incorporation of such additional metal oxide into the hydrogel may desirably act as a catalytic promoter under particular reaction conditions. After water-washing free of soluble material, the resulting hydrogel containing the powdered material is dried and, if desired, subsequently calcined to yield a highly attrition-resistant gel.

A preferred embodiment of the invention resides in the use of dispersing agents in the hydrosol containing dispersed powdered material of the type hereinabove described. By incorporating a dispersing agent in the hydrosol along with the powdered solid material, it has been found that tendency of the powdered material to agglomerate is prevented. The dispersing agent may be added to the hydrosol in any feasible manner, for example, by adding to the solid material to be incorporated in the hydrosol prior to grinding thereof or during grinding to the requisite particle size. Alternatively, the dispersing agent may be added to the hydrosol containing powdered material before the same sets to a hydrogel, or the dispersing agent may be introduced with one of the reactant solutions used to form the hydrosol. The dispersing agent employed may be either of the ionic or non-ionic type. Typical suitable dispersing agents include ethylene oxide polymers, ethylene oxide-alkyl phenol polymers, fatty acid soaps, such as the alkali metal salts of such fatty acids as oleic, linoleic, stearic, linolenic, and palmitic acids, alkyl sulfonate salts, inorganic and organic acids, gum arabic, sodium hexametaphosphate, lecithin, aralkyl sulfonates, alkylated phenol sulfonates, sodium pyrophosphate, partial esters of polyhydroxyalcohols, salts of lignin sulfonic acid, tannic acid, sodium silicate, and the like. The quantity of dispersing agent required is generally very small. As little as .01 percent by weight may be used and, generally, the quantity employed does not exceed about 1 percent by weight. The particular amount of dispersing agent introduced into the hydrosol will depend upon the quantity and surface area of the powdered material present and upon the characteristics of such material.

The powdered material incorporated in the hydrosol is suitably prepared by grinding or ball-milling such material with or without added water to the requisite particle size. During such operation the aforementioned dispersing agents may be added to facilitate break-down and deflocculation of the material.

The intermediate hydrogel state obtained in preparation of present gels is to be distinguished from a gelatinous precipitate. True, all-embracing hydrogels occupy the entire volume of the solution from which they are formed and possess a definitely rigid structure. When fractured, a true hydrogel shows a conchoidal fracture as compared to an irregular ragged edge fracture observed in the case of gelatinous precipitates. The latter, moreover, occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that due to the rigid structure they can be formed into high quality spheroidal particles.

The attrition characteristics of the gels prepared in accordance with the method described herein were determined by an attrition test known as the Lauson Shaker Test. The procedure used in the test consists of shaking a 50-cc. sample of the product to be tested in a closed steel cup which is bolted to the piston of a motor-driven Lauson engine which operates at 1350 r.p.m. After shaking for 10 seconds, the catalyst fines produced, passing through a 10-mesh (Tyler) screen, are replaced with an equal weight of fresh catalyst make-up. These operations are repeated for 20 cycles or until the amount of fines produced during successive cycles remains essentially constant. The attrition (fines loss per cycle), expressed as percent of original sample, is plotted against the cumulative weight percent replacement. The equilibrium weight percent fines as read from this plot is reported as the Lauson Shaker Test attrition. Since the Lauson Shaker Test attrition of gels is affected by the density and size of the particles tested, the attrition data reported herein correspond to an average particle diameter of 0.135 inch and an apparent density of 0.75 g./cc. to avoid the interference of these variables in correlating the effect of quantity and size of added powdered material on attrition.

The following examples will serve to illustrate the product and process of the present invention without limiting the same:

EXAMPLE I

Silica-alumina gel containing a small amount of chromia was prepared by mixing streams comprising: (1) aluminum sulphate dissolved in an aqueous solution of sulphuric acid, and (2) sodium silicate containing powdered dried silica-alumina gel of specified particle size. The sulphuric acid-aluminum sulphate stream was composed of 3.79 pounds of 96.3 percent sulphuric acid, 7.74 pounds of aluminum sulphate (containing 43 percent weight water), 0.315 pound of potassium chrome alum, and 117 pounds of water. The sodium silicate stream containing silica-alumina gel powder was composed of 48.0 pounds of sodium silicate having an $Na_2O$ to $SiO_2$ ratio of 1:3.22 and a density of 41° Bé, 48.4 pounds of water, and 3.6 pounds of dried silica-alumina gel powder containing approximately 90 percent weight $SiO_2$ and 10 percent weight $Al_2O_3$, and having a weight mean particle diameter of 2.0 microns.

Four hundred fifty-six cc./min. of the sulphuric acid-aluminum sulphate and 448 cc./min. of the sodium silicate slurry were mixed in a mixing nozzle to form a sol, which set to a hydrogel in 2.6 seconds at 60° F. The sol was formed into spheroidal hydrogel beads by introducing globules of the sol into an oil medium such as described in the aforementioned Marisic patent. The resulting hydrogel particles, having a pH of 8.5 were treated for 12 hours at 69° F. while covered with water. The hydrogel particles were thereafter base-exchanged with an aluminum sulphate solution to remove sodium from the structure of the gel, washed free of soluble salts, dried in superheated steam at 260° F. for 6 hours, and calcined for 3 hours at 1300° F. The resulting gel, which contained 20 percent volume of added powder, had a Lauson Shaker Test attrition of 1.3. Gel of the same composition, prepared similar to above, with the exception that no silica-alumina powder was introduced into the sol, showed a Lauson Shaker Test attrition of 4.7.

The particle size and quantity of powder incorporated in the sol and the Lauson Shaker Test attrition of other silica-alumina gels, prepared following the general procedure described above, are summarized in Table I.

Table I

| | Example | Weight Mean Particle Diameter, μ | Quantity of Powder, Percent Vol. Dried Gel in | Lauson Shaker Test Attrition of Finished Gel |
|---|---|---|---|---|
| | Blank (no powder) | ---------- | 0 | 4.7 |
| | 1 | 2.0 | 20 | 1.3 |
| | 2 | 2.0 | 2.0 | 3.7 |
| | 3 | 1.9 | 2.0 | 3.7 |
| | 4 | 1.9 | 4.8 | 3.6 |
| Effect of Quantity of Powder on Attrition Characteristics | 5 | 1.9 | 10 | 2.8 |
| | 6 | 1.9 | 10 | 2.7 |
| | 7 | 1.9 | 12 | 2.8 |
| | 8 | 1.9 | 15 | 2.8 |
| | 9 | 2.0 | 20 | 1.7 |
| | 10 | 1.9 | 20 | 1.4 |
| | 11 | 2.0 | 20 | 2.2 |
| | 12 | 1.9 | 24 | 2.1 |
| | 13 | 1.9 | 31 | 2.7 |
| | 14 | 1.7 | 37 | 2.5 |
| | 15 | 0.64 | 20 | 3.4 |
| | 16 | 0.64 | 20 | 3.3 |
| | 17 | 2.8 | 20 | 1.9 |
| Effect of Particle Diameter of Powder on Attrition Characteristics | 18 | 3.9 | 20 | 1.5 |
| | 19 | 5.2 | 20 | 2.6 |
| | 20 | 5.4 | 20 | 3.3 |
| | 21 | 8.3 | 20 | 16 |
| | 22 | 8.3 | 20 | 14 |
| | 23 | 3.4 | 20 | 2.0 |
| | 24 | 2.9 | 20 | 1.6 |

In the above examples, the powder was dispersed in the sodium silicate solution before mixing the sulphuric acid-aluminum sulphate and silicate streams, with the exception of Examples 12, 13, and 14, in which the powder was dispersed in the sulphuric acid-aluminum sulphate stream before the same was mixed with the sodium silicate stream. The addition of ammonium hydroxide to an aqueous slurry of the powder to increase the pH from about 4 to about 9, before mixing this slurry with the silicate solution aided in producing a good dispersion, particularly for very fine powders and high concentrations of powders in the gel.

The effect of the quantity of powder on the Lauson Shaker Test attrition of the resultant gels is shown graphically in Figure 1 of the drawing. It will be noted from this figure that the lowest attrition is obtained with gels containing between about 2 and about 40 percent volume of powder and particularly between about 15 and about 30 percent volume of powder, with the optimum resistance to attrition being obtained with a gel containing approximately 20 percent volume of powder.

The effect of particle size of the powder on the Lauson Shaker Test attrition of the resulting gels is shown in Figure 2 of the drawing. It will be seen from this figure that minimum attrition is achieved with powder having a weight mean particle diameter of between 1 and 5 microns and particularly between 2 and 4 microns, with the optimum resistance to attrition being attained with a weight means particle diameter of approximately 3 microns. It is evident from this figure that close control of the particle size of the powder within the aforementioned range is essential in achieving the exceptional resistance to attrition obtained with present gels.

As an illustration of the wide variety of powdered materials capable of increasing the attrition resistance of various inorganic oxide gels, the following examples show applications involving the dispersions in such gels of pulverized metallic and non-metallic elements, metal oxides, and metal salts, as well as powdered gels of various composition.

EXAMPLE 25

POWDERED SAND DISPERSED IN SILICA-ALUMINA GEL

Silica-alumina gel was prepared by mixing streams comprising: (1) aluminum sulphate dissolved in an aqueous solution of sulphuric acid, (2) a sodium silicate solution, and (3) an aqueous suspension of pulverized sand. The sulphuric acid-aluminum sulphate stream was composed of 3.92 pounds of 96.3 percent sulphuric acid, 7.74 pounds of aluminum sulphate (containing 43 percent water, and 114.5 pounds of water. The sodium silicate stream was composed of 75 pounds of sodium silicate solution, having an $Na_2O$ to $SiO_2$ ratio of 1:3.22 and a density of 41° Bé, and 25 pounds of water. The suspension of sand was composed of 10 pounds of pulverized sand, having a weight mean particle diameter of 4 microns, and 90 pounds of water.

Four hundred fifty-two cc./min. of the sulphuric acid-aluminum sulphate solution, 270 cc./min. of the silicate solution, and 187 cc./min. of the sand suspension were mixed in a nozzle to produce a sol, which had a gel time of 1.0 second at 55° F. The sol was converted into bead hydrogel as described above, which had a pH of 8.8. The resulting hydrogel was contacted with water for 4 hours at 124° F., base-exchanged with aluminum sulphate, washed free of soluble salts, dried for 5 hours in superheated steam at 260° F. and calcined for 3 hours in air at 1300° F. The resulting gel showed a Lauson Shaker Test attrition of 1.5.

EXAMPLE 26

GRAPHITE DISPERSED IN SILICA-ALUMINA GEL

Graphite having a weight mean particle diameter of approximately 1 micron, in the form of an aqueous suspension known commercially as "Aquadag," was dispersed in a silica-alumina gel in a manner similar to Example 1. The quantity of graphite was equivalent to 4.7 percent volume of the dried gel. The resulting bead hydrogel formed with this material was aged 8 hours at 124° F. in water, base-exchanged with aluminum sulphate, washed free of soluble salts and dried in superheated steam for 3½ hours at 280° F. One portion of the dried gel was heated 24 hours at 1200° F. in a steam atmosphere to prevent the carbon from burning. The resulting gel in this case had a Lauson Shaker Test attrition of 0.8. Another portion of the dried gel was calcined 10 hours at 1400° F. in air to burn out the carbon. The resulting gel in this case had a Lauson Shaker Test attrition of 1.8.

EXAMPLE 27

ALUMINUM PHOSPHATE DISPERSED IN SILICA-ALUMINA GEL

Silica-alumina gel containing dispersed aluminum phosphate was prepared by mixing streams comprising: (1)

aluminum sulphate dissolved in an aqueous solution of sulphuric acid, (2) a sodium silicate solution, and (3) an aqueous suspension of aluminum phosphate. The sulphuric acid-aluminum sulphate stream was composed of 4.36 pounds of 96.3 percent sulphuric acid, 7.81 pounds of aluminum sulphate (containing 43 percent weight water), and 114.4 pounds of water. The sodium silicate stream was composed of 75 pounds of sodium silicate having an $Na_2O$ to $SiO_2$ ratio of 1:3.22 and a density of 41° Bé, and 25 pounds of water. The aluminum phosphate suspension was composed of 2 pounds of aluminum phosphate powder having a weight mean particle diameter of 2.5 microns and 98 pounds of water.

Four hundred thirty-five cc./min. of the sulphuric acid-aluminum sulphate solution, 268 cc./min. of the silicate solution, and 208 cc./min. of the aluminum phosphate slurry were mixed in a nozzle to produce a sol which had a gel time of 2.7 seconds at 50° F. The sol was converted into bead hydrogel, which had a pH of 8.3. The hydrogel was aged 36 hours at 68° F. in water, base-exchanged with aluminum sulphate, washed free of soluble salts, dried in superheated steam for 3½ hours at 280° F. and calcined in air for 3 hours at 1300° F. The resulting gel showed a Lauson Shaker Test attrition of 3.2.

EXAMPLE 28

METALLIC ALUMINUM DISPERSED IN SILICA GEL

Silica gel containing dispersed aluminum was prepared by mixing streams comprising: (1) an aqueous solution of sulphuric acid, (2) an aqueous sodium silicate solution, and (3) an aqueous suspension of metallic aluminum. The sulphuric acid stream was composed of 17.4 pounds of 96.3 percent sulphuric acid and 127 pounds of water. The sodium silicate stream was composed of 105 pounds of sodium silicate having an $Na_2O$ to $SiO_2$ ratio of 1:3.22 and a density of 41° Bé, and 105 pounds of water. The aqueous suspension of aluminum was composed of 6.89 pounds of finely pulverized metallic aluminum powder, 181 pounds of water, and 30 cc. of a polyoxyethylene alkyl phenol dispersing agent.

Two hundred sixty-five cc./min. of the sulphuric acid solution, 400 cc./min of the silicate solution, and 105 cc./min. of the aluminum suspension were mixed in a nozzle to form a sol, which had a gel time of 2.7 seconds at 114° F. The sol was converted into bead hydrogel, which had a pH of 7.4. The bead hydrogel was base-exchanged with aluminum sulphate, washed free of soluble salts, dried in superheated steam for 5 hours at 260° F. and calcined in air for 3 hours at 1400° F. The resulting gel had a Lauson Shaker Test attrition of 2.2, while the corresponding silica gel prepared without the addition of powdered aluminum showed a Lauson Shaker Test attrition of 8.2.

EXAMPLE 29

SILICA DISPERSED IN SILICA-MAGNESIA GEL

Silica-magnesia gel containing dispersed powdered silica gel was prepared by mixing streams comprising: (1) an aqueous solution of sulphuric acid, (2) an aqueous sodium silicate solution, and (3) an aqueous suspension of magnesia containing powdered dried silica gel. The sulphuric acid stream was composed of 17.4 pounds of 96.3 percent sulphuric acid and 127 pounds of water. The sodium silicate stream was composed of 105 pounds of sodium silicate having an $Na_2O$ to $SiO_2$ ratio of 1:3.22 and a density of 41° Bé, and 105 pounds of water. The aqueous suspension of magnesia containing powdered silica gel was composed of 13 pounds of magnesia, 12.5 pounds of silica gel having a weight mean particle diameter of 4.2 microns and 181 pounds of water.

Two hundred sixty-five cc./min. of sulphuric acid solution, 400 cc./min. of silicate solution, and 344 cc./min. of the magnesia slurry containing silica gel powder were mixed in a nozzle to produce a sol, which had a gel time of 3.0 seconds at 86° F. The sol was converted into bead hydrogel, which had a pH of 9.4. The bead hydrogel was heated in water for 6 hours at 160° F., base-exchanged with magnesium sulphate, washed free of soluble salts, dried in superheated steam for 3 hours at 260° F. and calcined in air for 3 hours at 1300° F. The resulting gel had a Lauson Shaker Test attrition of 1.4 as compared with a Lauson Shaker Test attrition of 4.1 for a corresponding silica-magnesia gel prepared without the addition of silica gel powder.

EXAMPLE 30

ALUMINA DISPERSED IN SILICA-MAGNESIA GEL

Silica-magnesia gel containing dispersed alumina was prepared by mixing streams of: (1) an aqueous sulphuric acid, (2) a sodium silicate solution, and (3) an aqueous magnesia suspension containing powdered alumina. The sulphric acid stream was composed of 17.4 pounds of 96.3 percent sulphuric acid and 127 pounds of water. The sodium silicate solution was composed of 105 pounds of sodium silicate having an $Na_2O$ to $SiO_2$ ratio of 1:3.22 and a density of 41° Bé, and 105 pounds of water. The magnesia suspension containing powdered alumina was composed of 4.5 pounds of magnesia, 4.5 pounds of alumina having a weight mean particle diameter of 3.5 microns, and 91 pounds of water.

Two hundred forty-eight cc./min. of the sulphuric acid solution, 400 cc./min. of the silicate solution, and 471 cc./min. of the magnesia suspension containing powdered alumina were mixed in a nozzle to form a sol, which had a gel time of 5.1 seconds at 84° F. The sol was converted into bead hydrogel, which had a pH of 9.7. The bead hydrogel was heated for 6 hours at 110° F. in water, base-exchanged with ammonium sulphate, washed free of soluble salts, dried in superheated steam for 4 hours at 260° F., and calcined 3 hours in air at 1300° F. The resulting gel had a Lauson Shaker Test attrition of 2.1 as compared with a Lauson Shaker Test attrition of 4.1 for silica-magnesia gel which did not contain powdered alumina.

EXAMPLE 31

SILICA-MAGNESIA DISPERSED IN SILICA-MAGNESIA GEL

Silica-magnesia gel having silica-magnesia powder dispersed therein was prepared by mixing streams comprising: (1) a sulphuric acid solution, (2) a sodium silicate solution, and (3) an aqueous magnesia suspension containing silica-magnesia gel powder. The sulphuric acid stream was composed of 17.4 pounds of 96.3 percent sulphuric acid and 127 pounds of water. The sodium silicate stream was composed of 105 pounds of sodium silicate solution having an $Na_2O$ to $SiO_2$ ratio of 1:3.22 and a density of 41° Bé, and 105 pounds of water. The aqueous magnesia suspension was composed of 13.0 pounds of magnesia, 12.5 pounds of silica-magnesia gel powder containing approximately 74 percent by weight $SiO_2$ and 26 percent weight MgO and having a weight means particle diameter of 3.7 microns, and 0.062 pound of polyoxyethylene alkyl phenol dispersing agent.

Two hundred sixty-five cc./min. of the sulphuric acid solution, 400 cc./min. of the sodium silicate solution, and 340 cc./min. of the magnesia suspension containing silica-magnesia powder were mixed in a nozzle to produce a sol, which had gel time of 2.8 seconds at 90° F. The sol was converted into bead hydrogel, which had a pH of 9.7. The bead hydrogel was heated in water for 6 hours at 160° F., base-exchanged with magnesium sulphate solution, washed free of soluble salts, dried in superheated steam 3½ hours at 260° F., and calcined in air for 3 hours at 1300° F. The resulting gel had a Lauson Shaker Test attrition of 3.0 as compared with a Lauson Shaker Test attrition of 4.1 for a silica-magnesia gel which did not contain silica-magnesia powder.

EXAMPLE 32

SILICA-ALUMINA DISPERSED IN SILICA-ALUMINA-MAGNESIA GEL

Silica-alumina-magnesia gel was prepared having silica-alumina gel powder dispersed therein by mixing streams comprising: (1) aluminum sulphate dissolved in an aqueous solution of sulphuric acid, (2) a sodium silicate solution, and (3) an aqueous suspension of magnesia containing silica-alumina gel powder. The sulphuric acid-aluminum sulphate stream was composed of 7 pounds of 96.3 percent sulphuric acid, 20 pounds of aluminum sulphate (containing 43 percent weight water), and 103 pounds of water. The sodium silicate stream was composed of 105 pounds of sodium silicate having an $Na_2O$ to $SiO_2$ ratio of 1:3.22 and a density of 41° Bé, and 105 pounds of water. The magnesia suspension containing powdered silica-alumina gel was composed of 11.5 pounds of magnesia, 9.75 pounds of silica-alumina gel powder containing approximately 90 percent weight $SiO_2$ and 10 percent weight $Al_2O_3$ and having a weight mean particle diameter of 5.0 microns.

Two hundred twenty-three cc./min. of the sulphuric acid-aluminum sulphate solution, 365 cc./min. of the sodium silicate solution, and 393 cc./min. of the magnesia suspension containing powdered silica-alumina gel were mixed in a nozzle to produce a sol, which had a gel time of 2.7 seconds at 79° F. The sol was converted into bead hydrogel, which had a pH of 9.9. The bead hydrogel was heated in water for 6 hours at 160° F., base-exchanged with aluminum sulphate, washed free of soluble salts, dried in superheated steam for 5 hours at 260° F., and calcined for 3 hours in air at 1300° F. The resulting gel had a Lauson Shaker Test attrition of 1.3 as compared with a Lauson Shaker Test attrition of 3.4 for a comparable silica-alumina-magnesia gel which did not contain silica-alumina powder.

EXAMPLE 33

SILICA-MAGNESIA DISPERSED IN SILICA-ALUMINA-MAGNESIA GEL

Silica-alumina-magnesia gel was prepared containing dispersed silica-magnesia powder by mixing streams comprising: (1) aluminum sulphate dissolved in an aqueous solution of sulphuric acid, (2) a sodium silicate solution, and (3) an aqueous magnesia suspension containing powdered silica-magnesia gel. The sulphuric acid-aluminum sulphate stream was composed of 10.1 pounds of 96.3 percent sulphuric acid, 9.63 pounds of aluminum sulphate (containing 43 percent water), and 104.5 pounds of water. The sodium silicate stream was composed of 105 pounds of sodium silicate having an $Na_2O$ to $SiO_2$ ratio of 1:3.22 and a density of 41° Bé, and 105 pounds of water. The aqueous magnesia suspension containing silica-magnesia powder was composed of 4.0 pounds of magnesia, 8.78 pounds of silica-magnesia gel powder containing 74 percent weight $SiO_2$ and 26 percent weight MgO and having a weight mean particle diameter of 3.3 microns, and 183 pounds of water.

Two hundred thirty cc./min. of the sulphuric acid-aluminum sulphate solution, 365 cc./min. of the silicate solution, and 385 cc./min. of the magnesia suspension containing silica-magnesia powder were mixed in a nozzle to form a sol, which had a gel time of 3.3 seconds at 103° F. The sol was converted into bead hydrogel, which had a pH of 9.6. The bead hydrogel was heated in water for 6 hours at 160° F., base-exchanged with aluminum sulphate, washed free of soluble salts, dried in superheated steam at 280° F., and calcined for 3 hours in air at 1300° F. The resulting gel had a Lauson Shaker Test atttrition of 1.3, while the Lauson Shaker Test attrition for comparable silica-alumina-magnesia gel which did not contain powdered silica-magnesia was 3.4.

EXAMPLE 34

GRAPHITE DISPERSED IN CHROMIA-ALUMINA GEL

Chromia-alumina gel containing 32 percent by weight of chromia and 68 percent by weight of alumina and having graphite dispersed therein was prepared by introducing an aqueous suspension of graphite having a particle diameter of approximately 1 micron, commercially known as "Aquadag," in concentrated chromic acetate having an acetate to chromic ion ratio of 2.9:1 and a specific gravity at 72° F. of 1.275. The chromic acetate slurry so obtained was mixed in a nozzle with aqueous sodium aluminate solution having a sodium to aluminum ion ratio of 1.3:1 and a specific gravity at 88° F. of 1.406 to produce a sol which had a gel time of 7.5 seconds at 118° F. The sol was converted into bead hydrogel, which had a pH of about 12. The hydrogel was aged for 24 hours at room temperature in 20 percent ammonium sulphate solution, washed free of soluble salts, dried in superheated steam at 235° F., and calcined in steam atmosphere for 1 hour at 1000° F. The resulting gel had a Lauson Shaker Test attrition of 4.8, while a comparable chromia-alumina gel prepared without the addition of graphite had a Lauson Shaker Test attrition of 9.6.

EXAMPLE 35

CHROMIA-ALUMINA DISPERSED IN CHROMIA-ALUMINA GEL

Chromia-alumina gel containing 32 percent by weight of chromia and 68 percent by weight of alumina and having chromia-alumina gel powder dispersed therein was prepared by grinding gel containing 32% by weight $Cr_2O_3$ and 68% by weight of $Al_2O_3$, 6.05 pounds of water, in a ball mill for 98 hours. The weight mean particle diameter of the resulting ground chromia-alumina was 3.1 microns. Varying amounts of the slurry obtained from the above grinding operation, equivalent, respectively, to 5, 10, 15, and 20 percent by weight of the gel powder in the dried gel product were mixed with 0.50 pound of water and 8 pounds of concentrated chromic acetate having an acetate to chromic ion ratio of 2.9:1 and a specific gravity at 72° F. of 1.275. The chromic acetate slurry so obtained was mixed in a nozzle with aqueous sodium aluminate solution having a sodium to aluminum ion ratio of 1.3:1 and a specific gravity at 88° F. of 1.406 to produce a sol, which had a gel time of 8-11 seconds at 110-115° F. The sol was converted into bead hydrogel, which had a pH of about 12. The hydrogel was aged for 24 hours at room temperature in 20 percent ammonium sulphate solution, washed free of soluble salts, dried in superheated steam at 235° F., and calcined for 1 hour at 1000° F. in steam. The resulting gels containing the specified amounts of chromia-alumina gel powder had the following indicated Lauson Shaker Test attrition:

| Percent volume of chromia-alumina powder | Lauson shaker test attrition |
|---|---|
| 5 | 7.7 |
| 10 | 7.5 |
| 15 | 5.7 |
| 20 | 6.0 |

Comparable chromia-alumina gel prepared without the addition of chromia-alumina gel powder had a Lauson Shaker Test attrition of 9.6.

A summary of the preparation of Examples 25–35 and the Lauson Shaker Test attrition of the finished gels are summarized in Table II.

Table II

| Example | Gel Phase | Dispersed Phase | Wt. Mean Particle Diameter of Powder in Microns | Percent Volume Powder in Dried Sol | Lauson Shaker Test Attrition |
|---|---|---|---|---|---|
| 25 | Silica-Alumina | Sand | | 0 | 4.7 |
| 26 | do | Graphite | 4.0 | 11 | 1.5 |
| 27 | do | Aluminum Phosphate | 1.0 | 4.7 | 0.8 |
| 28 | Silica | Aluminum | 2.5 | 2.1 | 3.2 |
| | do | | | 0 | 8.2 |
| | Silica-Magnesia | | | 2.3 | 2.2 |
| 29 | do | Silica Gel | 4.2 | 0 | 4.1 |
| 30 | do | Alumina | 3.5 | 21 | 1.4 |
| 31 | do | Silica-Magnesia Gel | 3.7 | 5.9 | 2.1 |
| | Silica-Alumina-Magnesia | | | 18 | 3.0 |
| 32 | do | Silica-Alumina Gel | 5.0 | 0 | 3.4 |
| 33 | do | Silica-Magnesia Gel | 3.3 | 18 | 1.3 |
| | | | | 18 | 1.3 |
| | Chromia-Alumina | | | 0 | 9.6 |
| | | | | 5 | 4.8 |
| 34 | do | Graphite | 1.0 | 5 | 7.7 |
| 35 | do | Chromia-Alumina Gel | 3.1 | 10 | 7.5 |
| | | | | 15 | 5.7 |
| | | | | 20 | 6.0 |

The effect of incorporating a dispersing agent in the hydrosol containing powdered material is illustrated by the following comparative examples:

EXAMPLE 36

A silica-magnesia gel was prepared by mixing streams comprising: (1) an aqueous solution of sulfuric acid, (2) an aqueous sodium silicate solution, and (3) an aqueous slurry of magnesia. The sulfuric acid stream was composed of 17.4 pounds of 96.3% sulfuric acid and 127 pounds of water. The sodium silicate stream was composed of 105 pounds of sodium silicate having an $Na_2O$ to $SiO_2$ ratio of 1:3.22 and a density of 41° Bé. and 105 pounds of water. The aqueous slurry of magnesia was composed of 13 pounds of magnesia and 181 pounds of water.

Two hundred sixty-five cc./min. of the sulfuric acid solution, 400 cc./min. of the silicate solution, and 335 cc./min. of the aqueous magnesia slurry were mixed in a nozzle to form a sol, which had a gel time of 4.5 seconds at 86° F. The sol was converted into bead hydrogel, which had a pH of 9.2. The hydrogel particles so obtained were hydrothermally treated for 6 hours at 160° F. and thereafter base-exchanged with magnesium sulfate solution and then washed free of soluble materials. The hydrogel particles so obtained were dried in superheated steam at about 260° F. and then calcined for 3 hours at 1300° F.

EXAMPLE 37

A silica-magnesia gel was prepared by mixing streams comprising: (1) an aqueous solution of sulfuric acid, (2) an aqueous sodium silicate solution, and (3) an aqueous slurry of magnesia containing a small amount of a polyoxyethylene alkyl phenol dispersing agent. The sulfuric acid stream was composed of 17.4 pounds of 96.3% sulfuric acid and 127 pounds of water. The sodium silicate stream was composed of 105 pounds of sodium silicate having an $Na_2O$ to $SiO_2$ ratio of 1:3.22 and a density of 41° Bé. and 105 pounds of water. The aqueous slurry of magnesia was composed of 13 pounds of magnesia, 181 pounds of water, and an amount of a polyoxyethylene alkyl phenol dispersing agent (Igepal CO) equivalent to 0.006 percent by weight of the hydrosol obtained upon mixing the three above-described streams.

Two hundred sixty-five cc./min. of the sulfuric acid solution, 400 cc./min. of the silicate solution, and 344 cc./min. of the magnesia slurry were mixed in a nozzle to form a sol which had a gel time of 3.5 seconds at 88° F. The sol was converted into bead hydrogel, which had a pH of 9.4. The hydrogel particles so obtained were hydrothermally treated for 6 hours at 160° F. and thereafter base-exchanged with magnesium sulfate solution and then washed free of soluble materials. The hydrogel particles so obtained were dried in superheated steam at about 260° F. and then calcined for 3 hours at 1300° F.

EXAMPLE 38

A silica-magnesia gel containing dispersed powdered silica-magnesia gel was prepared by mixing streams comprising: (1) an aqueous solution of sulfuric acid, (2) an aqueous sodium silicate solution, and (3) an aqueous slurry of magnesia containing powdered dried silica-magnesia gel and a polyoxyethylene alkyl phenol dispersing agent. The sulfuric acid stream was composed of 17.4 pounds of 96.3 percent sulfuric acid and 127 pounds of water. The sodium silicate stream was composed of 105 pounds of sodium silicate having an $Na_2O$ to $SiO_2$ ratio of 1:3.22 and a density of 41° Bé. and 105 pounds of water. The aqueous slurry of magnesia containing powdered silica-magnesia gel was composed of 13 pounds of magnesia, 12.5 pounds of silica-magnesia gel (26 percent MgO and 74 percent $SiO_2$) having a weight mean particle diameter of 3.7 microns, 181 pounds of water, and an amount of polyoxyethylene alkyl phenol dispersing agent (Igepal CO) equivalent to 0.01 percent by weight of the hydrosol obtained upon mixing the three above-described streams.

Two hundred sixty-five cc./min. of sulfuric acid solution, 400 cc./min. silicate solution, and 344 cc./min. of the magnesia slurry containing silica-magnesia gel powder were mixed in a nozzle to produce a sol which had a gel time of 2.8 seconds at 90° F. The sol was converted into bead hydrogel which had a pH of 9.6. The hydrosol particles so obtained were hydrothermally treated for 6 hours at 160° F. and thereafter base-exchanged with magnesium sulfate solution and then water-washed free of soluble materials. The hydrogel particles so obtained were dried in superheated steam at about 260° F. and then calcined for 3 hours at 1300° F.

The gel compositions of Examples 36, 37, and 38 were tested for attrition characteristics as well as for percentage of whole beads and the results thereof are set forth in Table III below:

Table III

| Example | Hydrosol Composition | | | | | | Properties of Gel Product | |
|---|---|---|---|---|---|---|---|---|
| | Gel Phase | Dispersed Phase | Weight Mean Particle Diameter of Powder (Microns) | Amount of Dispersed Material, Percent Volume | Dispersing Agent | | Percent Wt. Whole Beads | Lauson Shaker Test Attrition |
| | | | | | Polyoxythylene Alkyl Phenol Surfactant | Quantity, Percent Wt. of Hydrosol | | |
| 36 | Silica-Magnesia | None | | | None | None | 77 | 4.1 |
| 37 | do | do | | | Igepal CO | 0.006 | 85 | 5.1 |
| 38 | do | Silica-Magnesia Gel Containing 26% Wt. MgO and 74% Wt. SiO₂ | 3.7 | 18 | do | 0.01 | 100 | 3.0 |

From the above-tabulated results, it will be seen by comparing Examples 36 and 37 that the percent of whole gel beads was improved by addition of a dispersing agent to the hydrosol. It is further evident, from Example 38, that a distinct improvement in the attrition resistance as well as the percent of whole beads of the finished product was attained by incorporating a dispersing agent and pulverized gel in the hydrosol.

The effect of particle size of the dispersed powder on attrition of the resulting gel for specified silica-magnesia and silica-alumina-magnesia gels prepared following the general procedure described hereinabove is shown in Table IV below:

Table IV

| Example | Gel Phase | Dispersed Phase | Quantity of Powder, Percent Volume of Finished Gel | Weight Mean Particle Diameter of Powder (Microns) | Processing Conditions | | | Lauson Shaker Test Attrition |
|---|---|---|---|---|---|---|---|---|
| | | | | | Hydrothermal Treatment | Base Exchange Ion | Calcining Conditions | |
| | Silica-Magnesia | | | | 6 hrs. at 160° F. | Mg⁺⁺ | 3 hrs. in air at 1,300° F. | 4.1 |
| 38 | do | Silica-Magnesia Gel (74% SiO₂–26% MgO) | 18 | 3.7 | do | Mg⁺⁺ | do | 3.0 |
| 39 | do | do | 18 | 9.2 | do | Mg⁺⁺ | do | 8.2 |
| | Silica-Alumina-Magnesia | | | | do | Al⁺⁺⁺ | do | 3.4 |
| 40 | do | Silica-Magnesia Gel (74% SiO₂–26% MgO) | 18 | 21 | do | Al⁺⁺⁺ | do | 71.0 |
| 41 | do | do | 18 | 12 | do | Al⁺⁺⁺ | do | 11 |
| 42 | do | do | 18 | 5.3 | do | Al⁺⁺⁺ | do | 2.0 |
| 43 | do | do | 18 | 3.3 | do | Al⁺⁺⁺ | do | 1.3 |

It is evident from the above data that the particle size of dispersed powder has a direct effect on the attrition characteristics of the resulting gel. In accordance with the invention, the weight mean particle diameter of the powder is in the range of 1–5 microns and preferably in the range of 2–4 microns.

The effect of base exchange on gels prepared in accordance with the process of the invention is shown in Examples 44–47 set forth in Table V below:

Table V

| Example | Gel Phase | Dispersed Phase | Quantity of Powder, Percent Volume of Finished Gel | Weight Mean Particle Diameter of Powder (Microns) | Processing Conditions | | | Composition of Finished Gel (Percent Wt.) | | | Lauson Shaker Test Attrition |
|---|---|---|---|---|---|---|---|---|---|---|---|
| | | | | | Hydrothermal Treatment | Base Exchange Ion | Calcining Conditions | Al₂O₃ | MgO | SiO₂ | |
| 44 | Silica-Magnesia | Silica-Magnesia Gel (74% SiO₂–26% MgO) | 18 | 4.6 | 6 hrs. at 160° F. | None | 3 hrs. in air at 1,300° F. | 0 | 26 | 74 | 3.7 |
| 45 | do | do | 18 | 4.6 | do | NH₄⁺ | do | 0 | 26 | 74 | 3.2 |
| 46 | do | do | 18 | 4.6 | do | Mg⁺⁺ | do | 0 | 26 | 74 | 3.2 |
| 47 | do | do | 18 | 4.6 | do | Al⁺⁺⁺ | do | 10 | 16 | 74 | 2.9 |

The above data indicates that, while base exchange is desirable, it does not appreciably affect the attrition characteristics of gels prepared as described herein.

The effect of calcining the dried gels prepared in accordance with the instant invention is shown in Table VI below:

Table VI

| Example | Gel Phase | Dispersed Phase | Quantity of Powder, Percent Volume of Finished Gel | Weight Mean Particle Diameter of Powder (Microns) | Processing Conditions - Hydrothermal Treatment | Base Exchange Ion | Calcining Conditions | Composition of Finished Gel (Percent Wt.) $Al_2O_3$ | MgO | $SiO_2$ | Lauson Shaker Test Attrition |
|---|---|---|---|---|---|---|---|---|---|---|---|
|  | Silica-Magnesia | ---------- | 0 | ---------- | 6 hrs. at 160° F. | Mg++ | None | 0 | 27 | 73 | 7.3 |
| 48 | ----do---- | Silica-Magnesia Gel (74% $SiO_2$—26% MgO). | 18 | 4.6 | ---do--- | Mg++ | 3 hrs. at 1,300° F. | 0 | 27 | 73 | 4.1 |
|  | ----do---- | ----do---- | 0 | ---------- | ---do--- | None | None | 0 | 26 | 74 | 6.8 |
| 44 | ----do---- | ----do---- | 18 | 4.6 | ---do--- | None | 3 hrs. in air at 1,300° F. | 0 | 26 | 74 | 3.7 |
| 49 | ----do---- | ----do---- | 18 | 4.6 | ---do--- | $NH_4^+$ | None | 0 | 26 | 74 | 6.2 |
| 45 | ----do---- | ----do---- | 18 | 4.6 | ---do--- | $NH_4^+$ | 3 hrs. in air at 1,300° F. | 0 | 26 | 74 | 3.2 |
| 50 | ----do---- | ----do---- | 18 | 4.6 | ---do--- | Mg++ | None | 0 | 26 | 74 | 6.8 |
| 46 | ----do---- | ----do---- | 18 | 4.6 | ---do--- | Mg++ | 3 hrs. in air at 1,300° F. | 0 | 26 | 74 | 3.2 |

It is evident from the above data that the improvement in hardness obtained in accordance with the instant process is observed both in the case of gels which have been merely dried and in the case of gels which have been dried and subsequently calcined. The calcined gels exhibited greater resistance to attrition over the gels which had merely been dried and it is accordingly preferable but not essential in the present process to subject the dried gels containing powdered material to subsequent calcination.

I claim:

1. A method for preparing an inorganic oxide gel characterized by high resistance to attrition, which comprises dispersing in an inorganic oxide sol a powdered material insoluble therein having a weight mean particle diameter of between 2 and 4 microns, effecting gelation of said sol containing powdered material and drying the resulting hydrogel at a temperature below the fusion point of said material.

2. A method for preparing an inorganic oxide gel characterized by high resistance to attrition, which comprises dispersing in an inorganic oxide sol a powdered material insoluble therein having a weight mean particle diameter of between 2 and 4 microns, effecting gelation of said sol containing powdered material, drying and calcining the resulting hydrogel at a temperature below the fusion point of said material.

3. A method for preparing an inorganic oxide gel characterized by high resistance to attrition, which comprises dispersing in an inorganic oxide sol a powdered material insoluble therein having a weight mean particle diameter of between 2 and 4 microns, effecting gelation of said sol containing powdered material and drying the resulting hydrogel until maximum shrinkage thereof has been attained at a temperature below the fusion point of said material.

4. A method for preparing an inorganic oxide gel characterized by high resistance to attrition, which comprises dispersing in an inorganic oxide sol an amount corresponding to between about 15 and about 30 percent by volume of the dried gel of a powdered material insoluble therein having a weight mean particle diameter of between 2 and 4 microns, effecting gelation of said sol containing powdered material and drying the resulting hydrogel at a temperature below the fusion point of said material.

5. A method for preparing an inorganic oxide gel characterized by high resistance to attrition, which comprises dispersing in an inorganic oxide sol a powdered material insoluble therein having a weight mean particle diameter of between 2 and 4 microns, effecting gelation of said sol containing powdered material and dispersing agent and drying the resulting hydrogel at a temperature below the fusion point of said material.

6. A method for preparing spheroidal particles of an inorganic oxide gel characterized by high resistance to attrition, which comprises dispersing in an inorganic oxide sol a powdered material insoluble therein having a weight mean particle diameter of between 2 and 4 microns, forming spheroidal particles of said sol containing powdered material, effecting gelation of said spheroidal particles of sol and drying the resulting spheroidal hydrogel particles at a temperature below the fusion point of said material.

7. A method for preparing an inorganic oxide gel characterized by high resistance to attrition, which comprises dispersing in an inorganic oxide sol a powdered material insoluble therein having a weight mean particle diameter of between 2 and 4 microns, effecting gelation of said sol containing powdered material, drying the resulting hydrogel at a temperature in the approximate range of 150 to 400° F., calcining the dried gel at a temperature above about 1150° F. but below the incipient sintering temperature of the dried gel, said calcining temperature being below the fusion point of said material.

8. A method for preparing a siliceous gel characterized by high resistance to attrition, which comprises dispersing in a siliceous sol a powdered material insoluble therein having a weight mean particle diameter of between 2 and 4 microns, effecting gelation of said sol containing powdered material and drying the resulting hydrogel at a temperature below the fusion point of said material.

9. A method for preparing an inorganic oxide gel characterized by high resistance to attrition, which comprises dispersing in an inorganic oxide sol powdered insoluble aluminous gel having a weight mean particle diameter of between 2 and 4 microns, effecting gelation of said sol containing powdered gel and drying the resulting hydrogel at a temperature below the fusion point of said powdered gel.

10. A method for preparing an inorganic oxide gel characterized by high resistance to attrition, which comprises dispersing in an inorganic oxide sol insoluble powdered siliceous gel having a weight mean particle diameter of between 2 and 4 microns, effecting gelation of said sol containing powdered gel and drying the resulting hydrogel at a temperature below the fusion point of said powdered gel, 11. A method for preparing a silica-alumina gel characterized by high resistance to attrition, which comprises dispersing in a silica-alumina sol a powdered material insoluble therein having a weight mean particle diameter of between 2 and 4 microns, effecting gelation of said sol containing powdered material and drying the resulting hydrogel at a temperature below the fusion point of said material.

12. A method for preparing a silica-magnesia gel characterized by high resistance to attrition, which comprises dispersing in a silica sol containing magnesia a powdered material insoluble therein having a weight mean particle diameter of between 2 and 4 microns, effecting gelation of said sol containing powdered material and drying the resulting hydrogel at a temperature below the fusion point of said material.

13. A method for preparing a silica-alumina-magnesia gel characterized by high resistance to attrition, which comprises dispersing in a silica-alumina sol containing magnesia a powdered material insoluble therein having a weight means particle diameter of between 2 and 4 microns, effecting gelation of said sol containing powdered material and drying the resulting hydrogel at a temperature below the fusion point of said material.

14. A method for preparing a chromia-alumina gel characterized by high resistance to attrition, which comprises dispersing in a chromia-alumina sol a powdered material insoluble therein having a weight mean particle diameter of between 2 and 4 microns, effecting gelation of said sol containing powdered material and drying the resulting hydrogel at a temperature below the fusion point of said material.

15. A method for preparing an inorganic oxide gel characterized by high resistance to attrition, which comprises dispersing in an inorganic oxide sol a powdered inorganic oxide gel insoluble therein having a weight mean particle diameter of between 2 and 4 microns, effecting gelation of said sol containing powdered material, drying and calcining the resulting hydrogel at a temperature below the fusion point of said powdered inorganic oxide gel.

16. An attrition-resistant inorganic oxide gel obtained upon removing the liquid phase from a hydrogel having initially dispersed therein a powdered insoluble material having a weight mean particle diameter of between 2 and 4 microns.

17. An attrition-resistant inorganic oxide gel obtained upon removal of the liquid phase and calcination of a hydrogel having initially dispersed therein a powdered material having a weight mean particle diameter of between 2 and 4 microns.

18. An attrition-resistant inorganic oxide gel obtained upon removing the liquid phase from a hydrogel having initially dispersed therein an amount corresponding to between about 15 and about 30 percent by volume of said gel of a powdered material having a weight mean particle diameter of between 2 and 4 microns.

References Cited in the file of this patent

UNITED STATES PATENTS

| | | |
|---|---|---|
| 2,071,987 | Ridler | Feb. 23, 1937 |
| 2,357,721 | Allan | Sept. 5, 1944 |
| 2,457,970 | Baile | Jan. 4, 1949 |
| 2,487,065 | Milliken | Nov. 8, 1949 |

UNITED STATES PATENT OFFICE
CERTIFICATE OF CORRECTION

Patent No. 2,900,349                                                   August 18, 1959

Albert B. Schwartz

It is hereby certified that error appears in the printed specification of the above numbered patent requiring correction and that the said Letters Patent should read as corrected below.

Column 12, line 22, for "sulphric" read -- sulphuric --; line 63, for "means" read -- mean --; columns 17 and 18, Table III, sixth column thereof, under the heading "Dispersing Agent", for the sub-heading "Poloxy-thylene Alkyl Phenol Surfactant" read -- Poloxyethylene Alkyl Phenol Surfactant --; column 21, line 21, for "means" read -- mean --.

Signed and sealed this 1st day of March 1960.

(SEAL)
Attest:

KARL H. AXLINE
Attesting Officer

ROBERT C. WATSON
                                                                               Commissioner of Patents